(12) United States Patent
Ishikawa et al.

(10) Patent No.: US 9,303,378 B2
(45) Date of Patent: Apr. 5, 2016

(54) FOREIGN-OBJECT OFFSHORE PROCESSING SYSTEM

(75) Inventors: Shinya Ishikawa, Niigata (JP); Takashi Saito, Sendai (JP); Kyoichi Shimizu, Ichikawa (JP); Masaki Suzuki, Yokohama (JP); Kota Shioda, Himeji (JP); Masaru Ieyasu, Himeji (JP)

(73) Assignees: TOHOKU ELECTRIC POWER CO., INC., Sendai-shi (JP); KANAE CORPORATION, Tokyo (JP); HIMEJI-ECOTECH CO., LTD., Himeji-shi (JP)

( * ) Notice: Subject to any disclaimer, the term of this patent is extended or adjusted under 35 U.S.C. 154(b) by 259 days.

(21) Appl. No.: 14/002,394

(22) PCT Filed: Mar. 2, 2011

(86) PCT No.: PCT/JP2011/001235
§ 371 (c)(1),
(2), (4) Date: Aug. 30, 2013

(87) PCT Pub. No.: WO2012/117449
PCT Pub. Date: Sep. 7, 2012

(65) Prior Publication Data
US 2014/0001107 A1    Jan. 2, 2014

(51) Int. Cl.
*E02B 5/08* (2006.01)
*E02B 8/02* (2006.01)
*E02B 9/04* (2006.01)
*E03B 1/02* (2006.01)
*E02B 1/00* (2006.01)

(52) U.S. Cl.
CPC . *E02B 9/04* (2013.01); *E02B 1/006* (2013.01); *E02B 5/08* (2013.01); *E02B 5/085* (2013.01); *E02B 8/023* (2013.01); *E03B 1/02* (2013.01)

(58) Field of Classification Search
CPC ........... E02B 1/006; E02B 5/08; E02B 5/085; E02B 8/02; E02B 8/023; E02B 9/04; E03B 1/00; E03B 1/02

USPC .......... 210/155, 162, 170.05, 170.09, 170.11, 210/747.5, 747.6; 405/80, 81, 127
See application file for complete search history.

(56) References Cited

U.S. PATENT DOCUMENTS

| | | | |
|---|---|---|---|
| 6,346,193 B1 * | 2/2002 | Bauer | 210/170.09 |
| 6,451,204 B1 * | 9/2002 | Anderson | 210/162 |
| 2010/0224570 A1 * | 9/2010 | Feher | 210/162 |
| 2011/0146802 A1 * | 6/2011 | Feher | 137/1 |
| 2013/0082007 A1 * | 4/2013 | Kennedy | 210/170.05 |

FOREIGN PATENT DOCUMENTS

| | | |
|---|---|---|
| JP | A 2004-278144 | 10/2004 |
| JP | A 2005-113450 | 4/2005 |
| JP | A 2007-160154 | 6/2007 |

OTHER PUBLICATIONS

May 31, 2011 Search Report issued in International Patent Application No. PCT/JP2011/001235 (with translation).

* cited by examiner

*Primary Examiner* — Christopher Upton
(74) *Attorney, Agent, or Firm* — Oliff PLC

(57) ABSTRACT

Provided is foreign-object offshore processing system, including foreign-object inflow prevention devices configured to prevent inflow of foreign object into water intake and provided at interval. Each device includes: collecting pontoon serving as inlet of foreign object and provided to float on sea surface of pool defined by curtain wall, the pool being for drawing cooling sea water from sea toward water intake; bottom net spreading toward sea bottom on upstream side of water intake channel in triangular shape with collecting pontoon as vertex; longitudinal net fixed to two floating chains in suspended manner to spread out in surface area of sea, the two floating chains extending on sea surface from collecting pontoon in correspondence with two sides extending from vertex of triangular shape forming bottom net; and lateral net spreading between bottom net and at least portion of longitudinal net, wherein horizontal net cover covers interval between adjacent devices.

7 Claims, 5 Drawing Sheets

FOREIGN-OBJECT OFFSHORE PROCESSING SYSTEM

TECHNICAL FIELD

The present invention relates to a foreign-object offshore processing system that is provided in a pool defined by a curtain wall that leads to a water intake of an facility utilizing a large amount of sea water as a coolant and that prevents inflow of floating foreign objects such as jellyfish.

BACKGROUND ART

Currently, nuclear power plants and thermal power plants take in a large amount of sea water for use as a coolant.

In order to prevent floating foreign objects such as jellyfish from flowing in through a sea water intake, a traveling screen or the like is disposed in front of the water intake. The foreign objects present on a sea surface or in sea water are caught in the screen which is rotatably displaced, and the caught foreign objects and the screen are lifted above the ground for collection.

The collected foreign objects mainly include jellyfish, which are often disposed as a waste.

However, in the event of massive proliferation of jellyfish and a massive inflow of jellyfish due to a flow of tide, the screen tends to be clogged up easily, and water intake is blocked.

Furthermore, since a large amount of jellyfish needs to be disposed as the waste, there is a need to take an environmental consequence into consideration, and a problem is also posed in terms of high disposal cost.

One possibility of addressing the above problems is to prevent entrance of jellyfish by entirely covering a water intake surface, which is an entrance route of jellyfish and the like, by a net (or a mesh material) spreading out in a direction along the water intake surface. However, in practice, the net is clogged up by jellyfish, and water intake to the plant is blocked, possibly resulting in a shutdown of a plant.

The above situation is to be strictly circumvented.

In order to solve the above problem, Patent Literature 1 discloses a device including longitudinal nets spreading out in a surface area of the sea, a bottom net having a triangular shape, and an opening provided between each longitudinal net and the bottom net, for example.

According to the above device, the number of the foreign objects such as jellyfish that reach the water intake is reduced.

Patent Literature 2 also discloses an offshore processing system that retains captured jellyfish in sea water so that the captured jellyfish are killed and then dissolved in sea water.

CITATION LIST

Patent Literatures

Patent Literature 1: JP2005113450A
Patent Literature 2: JP2007160154A

However, when the aforementioned device is used for the water intake including a large water intake width, it is necessary to enlarge the longitudinal net and the bottom net, or to provide a plurality of devices in the pool defined by the curtain wall.

Although enlargement of the longitudinal net and the bottom net is not achieved without an area with a depth for providing the nets, there is hardly such an offshore space, and the above method is not realistic.

In addition, when the plurality of devices is provided, jellyfish may enter thorough an interval between adjacent devices.

An attempt to minimize the interval involves provision of an even larger number of devices, thereby posing a problem of an increase in cost.

SUMMARY OF THE INVENTION

Technical Problem

The present invention has been conceived in view of the above problems and aims to provide a foreign-object offshore processing system that is capable of efficiently collecting foreign objects such as jellyfish with respect to the water intake including the large water intake width.

Solution to Problem

The present inventors repeated earnest studies to solve the above problems.

As a result, the present inventors have obtained findings about a system that is capable of sustaining water intake even when a net (referred to below as a horizontal net) spreading out in the direction along the water intake surface is provided on the sea.

That is to say, the present inventors have found that, by providing a plurality of devices configured to prevent inflow of the foreign objects (i.e. foreign-object inflow prevention devices) at an interval and by providing the horizontal net configured to cover the interval, jellyfish or the like may be collected first by the horizontal net at a high collection rate.

The present inventors have also found that, even when the horizontal net is clogged up by the foreign objects, a sea current expels the foreign objects toward the foreign-object inflow prevention devices, where the foreign objects are efficiently collected, and that water intake is possible from a location provided with the devices.

The present invention is based on the above findings, and content and structure of the present invention are as follows.

(1) A foreign-object offshore processing system, including:
  a plurality of foreign-object inflow prevention devices that is configured to prevent inflow of a foreign object into a water intake and that is provided at an interval, each of the plurality of foreign-object inflow prevention devices including:
    a collecting pontoon that is configured to serve as an inlet of the foreign object and that is provided to float on a sea surface of a pool defined by a curtain wall, the pool being for drawing cooling sea water from sea toward the water intake;
    a bottom net provided to spread out toward a sea bottom on an upstream side in a triangular shape with the collecting pontoon as a vertex;
    a longitudinal net fixed to each of two floating chains in a suspended manner so as to be spread out in a surface area of sea, the two floating chains being provided to extend on the sea surface from the collecting pontoon in correspondence with two sides extending from the vertex of the triangular shape forming the bottom net; and
    a lateral net provided to spread out between the bottom net and at least a portion of the longitudinal net, wherein
  a horizontal net is provided so as to cover the interval between adjacent ones of the plurality of foreign-object inflow prevention devices.

(2) The foreign-object offshore processing system of the item (1), which satisfies the following condition:

$$0 < L \leq Z - Q/(0.2 \times h)$$

where L (m) represents a spread length of the horizontal net, Z (m) represents an entire length of an offshore line determined by extending a line along which the horizontal net is provided, Q (m³/s) represents an amount of water intake in an effective water-intake section, and h (m) represents a height of the horizontal net.

(3) The foreign-object offshore processing system of the item (1) or (2), wherein an opening is provided on a sea bottom side of the longitudinal net on at least one end side of the foreign-object offshore processing system.

(4) The foreign-object offshore processing system of any one of the items (1)-(3), wherein a bubble tube configured to discharge air bubbles is provided in a lower portion of the bottom net.

Advantageous Effects

According to the offshore processing system of the present invention, a high collection rate of the foreign objects is achieved with respect to the water intake including the large water intake width. Consequently, inflow of the foreign objects into a plant is reduced, and therefore, a state where an operation of the plant is limited because of shortage in an amount of water intake is prevented, and an amount of the waste is also reduced.

Furthermore, according to the offshore processing system of the present invention, stable water intake to the plant is achieved.

Moreover, the offshore processing system of the present invention does not require a complex mechanism and requires only a reduced number of devices to be provided. Accordingly, the offshore processing system prevents an increase in cost and allows saving in energy and space.

DESCRIPTION OF EMBODIMENTS

Figure 1:
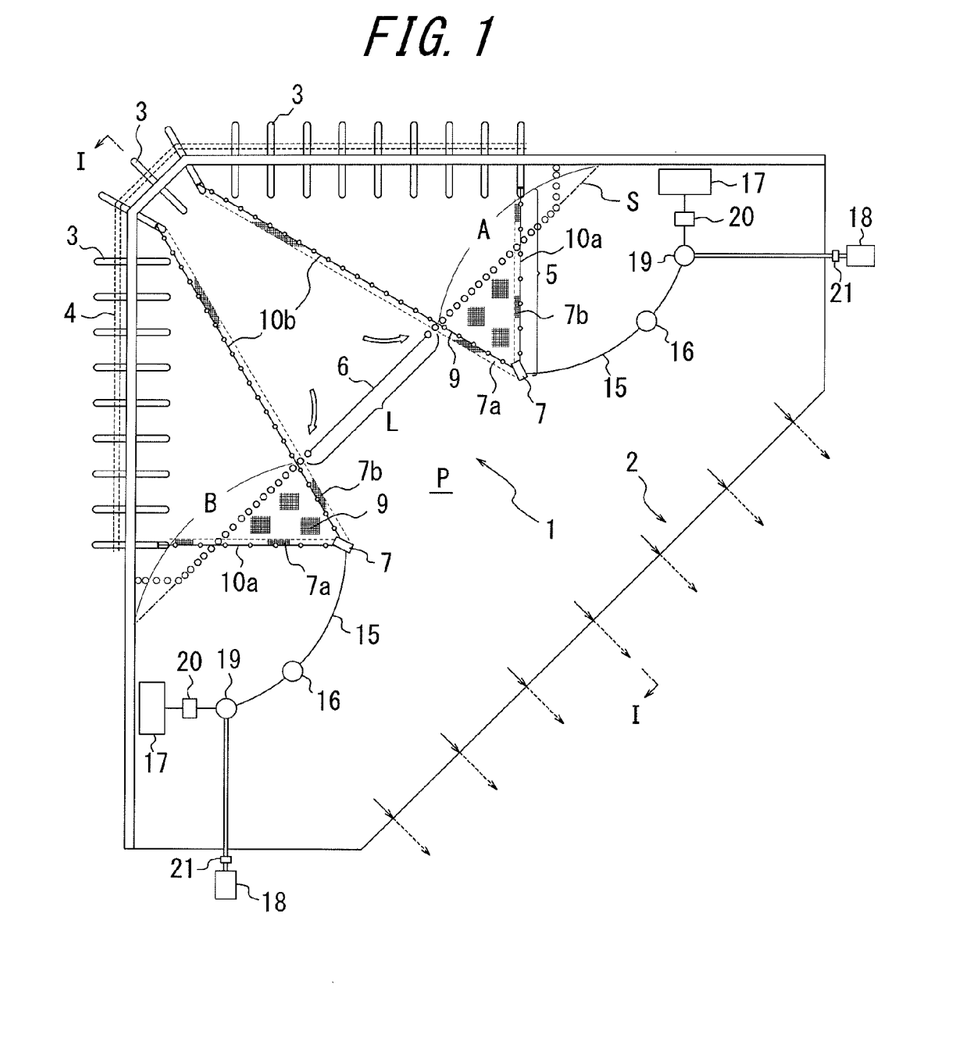
FIG. 1 illustrates a state where a foreign-object offshore processing system according to the present invention is provided at sea.

FIG. 1 illustrates a state where a foreign-object offshore processing system 1 according to the present invention is provided at sea.

In the illustrated example, a water intake 2 is provided on the sea for drawing cooling sea water in a direction indicated by arrows.

In the illustrated example, steel pipe piles 3 are provided on the offshore sea, and a curtain wall 4 is provided on the steel pile piles 3.

As illustrated in FIG. 1, the foreign object offshore processing system 1 according to the present invention includes a plurality of (e.g. two in the illustrated example) foreign-object inflow prevention devices 5 provided at an interval so as to face a sea water inlet in a pool P (i.e. an area located between the curtain wall 4 and the water intake 2) defined by the curtain wall. The foreign object offshore processing system 1 also includes a horizontal net 6 configured to cover the interval between adjacent foreign-object inflow prevention devices 5.

The horizontal net 6 spreads out from a sea water surface to a sea bottom.

Figure 2:
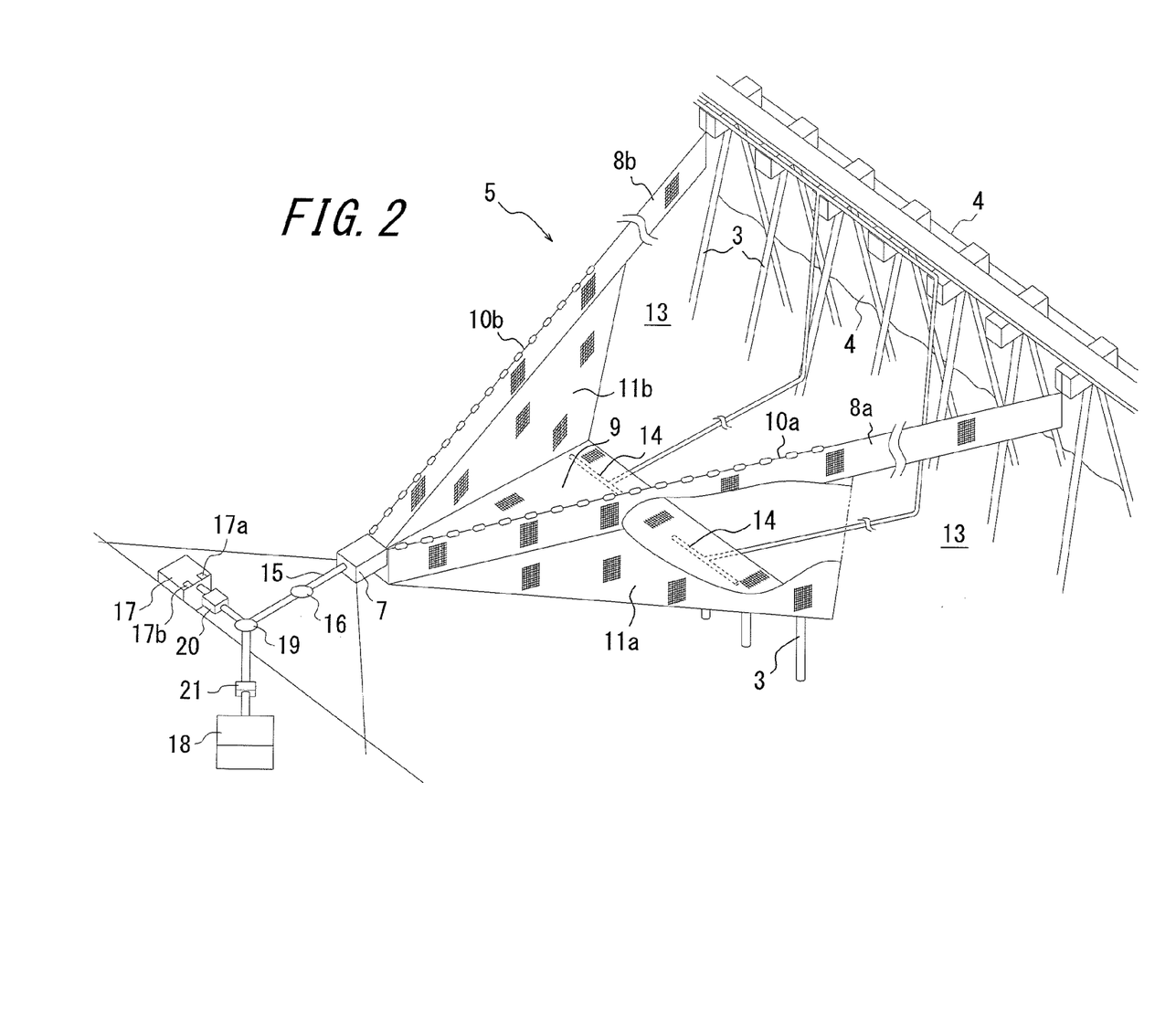
FIG. 2 is a perspective view of a foreign-object inflow prevention device.
Figure 3:
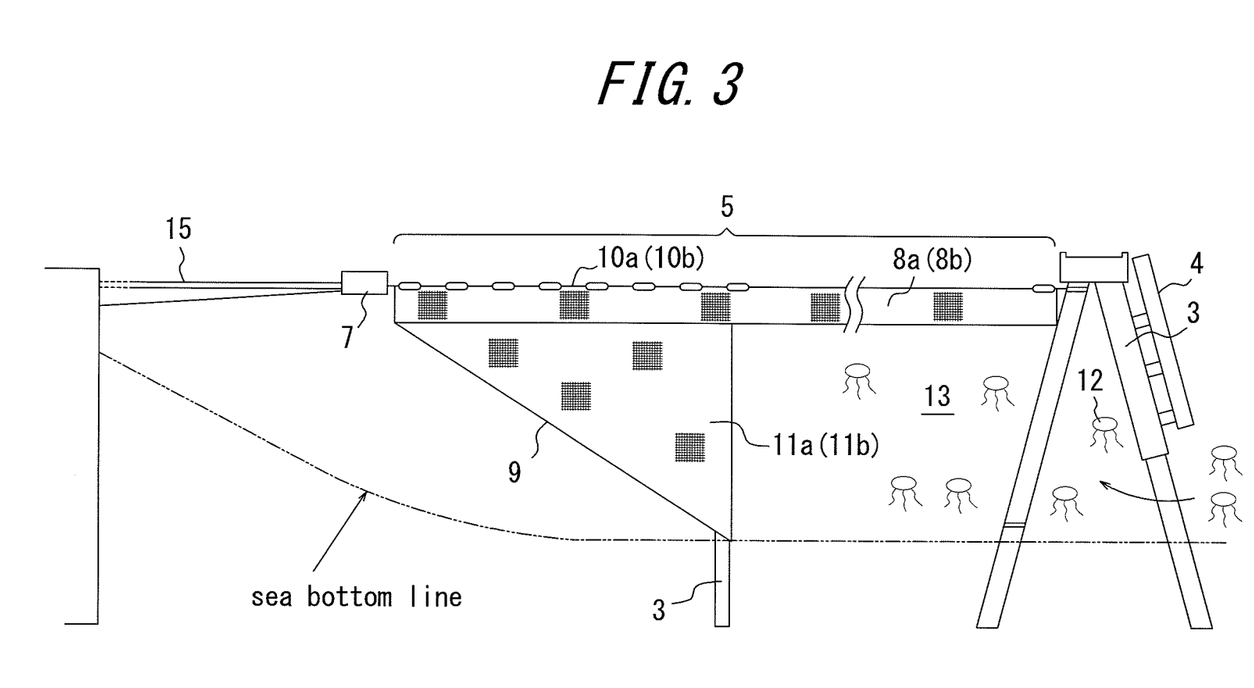
FIG. 3 is a sectional view taken along a line I-I of FIG. 1.

FIG. 2 is a perspective view of the foreign-object inflow prevention device 5, and FIG. 3 is a sectional view taken along a line I-I of FIG. 1. A description is given below of the foreign-object inflow prevention device with reference to FIGS. 2 and 3.

As illustrated in FIGS. 2 and 3, the foreign-object inflow prevention device 5 includes a collecting pontoon 7 disposed on the sea in the pool P defined by the curtain wall near the water intake 2. The collecting pontoon 7 serves as an inlet of the foreign objects such as jellyfish.

In the illustrated example, two longitudinal nets 8a and 8b are provided to extend from two positions in the steel pipe piles 3 toward the collecting pontoon 7. Furthermore, in a triangular shape defined by the longitudinal nets 8a and 8b, a bottom net 9 is provided to extend from the sea bottom toward the collecting pontoon 7.

On the other hand, on the sea, there are provided two floating chains 10a and 10b extending from the collecting pontoon 7 toward the steel pipe piles 3 in correspondence with two sides 7a and 7b extending from a vertex (i.e. the collecting pontoon 7) of the triangular shape defining the bottom net 9. In the illustrated example, a front end of each of the floating chains 10a and 10b is fixed to the corresponding steel pipe pile 3.

In this regard, the floating chains 10a and 10b are configured by coupling a plurality of floats using a rope.

The longitudinal nets 8a and 8b are fixed to the floating chains 10a and 10b in a suspended manner so as to be spread out in a surface area of the sea. The longitudinal net preferably spreads out in a range of 1-4 m below the sea surface.

Besides, the bottom net 9 is coupled to portions of the longitudinal nets 8a and 8b at least starting from the collecting pontoon via triangular-shaped lateral nets 11a and 11b.

The longitudinal nets 8a and 8b, the bottom net 10, and the lateral nets 11a and 11b integrally form a bag-shaped net.

In the example illustrated in FIG. 3, the curtain wall 4 is disposed to extend approximately 10 m deep below the sea surface on the offshore side of the steel pipe piles 3.

The following describes advantageous effects of the present invention.

To start with, the sea water which is to be used for cooling is guided to pass through the steel pipe piles 3 and flow toward the water intake 2, and foreign objects 12 such as jellyfish flow in on a flow of the sea water.

In this regard, according to the foreign-object offshore processing system of the present invention, the foreign objects such as jellyfish that have been guided to pass through the steel pipe piles 3 into the pool P defined by the curtain wall are captured by the horizontal net spreading from the sea water surface to the sea bottom.

The foreign objects such as jellyfish are also guided to be gathered in the collecting pontoon 7 by the bottom net, the lateral nets, and the longitudinal nets of the foreign-object inflow prevention device, and the jellyfish may be captured by the collecting pontoon as well.

In this regard, when the sea water passes through the curtain wall 4, typically, a turbulent flow occurs, and the jellyfish 12 floating near the sea bottom ascend to the surface area located under the sea surface. Accordingly, most (e.g.

approximately 80%) of the jellyfish 12 which have flown from under the curtain wall 4 into the pool P defined by the curtain wall come to float near the sea surface.

However, some (e.g. approximately 20%) of the jellyfish remain to float under the sea without ascending from near the sea bottom when passing near the curtain wall 4.

The present invention is capable of guiding the jellyfish which come to float on the sea surface by the longitudinal nets 8a and 8b of the foreign-object inflow prevention device 5 and also capable of guiding the jellyfish which travel ahead near the sea bottom to flow in by the bottom net 9. As a result, the jellyfish are efficiently collected.

Furthermore, entrance of the jellyfish is dispersed appropriately, and therefore, these foreign objects are prevented from clogging up the nets. As a result, maintenance cost is reduced.

As described above, since the present invention spreads the horizontal net from the sea surface to the sea bottom, and moreover, at least portions of the longitudinal nets are coupled to the bottom net via the lateral nets, the foreign objects entering at various depths under the sea may be collected by the collecting pontoon 7, whereby a collection rate of the foreign objects is increased.

Moreover, since the horizontal net is provided, the number of the foreign-object inflow prevention devices to be provided is reduced. As a result, an increase in cost is prevented, and saving in energy and space is achieved.

Next, a description is given of water intake.

When the foreign objects are captured by the horizontal net, the foreign objects gradually clog up the horizontal net, and accordingly, a decrease occurs in the amount of water intake from a location provided with the horizontal net.

However, when the horizontal net is clogged up, the flow of sea water is generated as indicated by arrows of FIG. 1. That is to say, the sea water is allowed to pass through meshes (gaps) of the horizontal net and then flow toward the water intake until the horizontal net is clogged up. However, once the meshes are clogged up by jellyfish and the like, there is no route for the sea water to flow out to the water intake. Accordingly, as illustrated in FIG. 1, the sea water, after loosing the flow route to the water intake, starts to flow toward the foreign-object inflow prevention device due to a characteristic (i.e. viscosity) as a fluid. A flow speed of the flowed sea water is increased as the horizontal net is further clogged up by the foreign objects.

Consequently, the sea water and the foreign objects flow toward the foreign-object inflow prevention device. That is to say, the horizontal net of the present invention functions as a guiding body which guides the current of the sea and the foreign objects toward the foreign-object inflow prevention device when the horizontal net is clogged up by the foreign objects.

The foreign objects such as jellyfish that have been guided toward the foreign-object inflow prevention device is then led by the bottom net from the sea bottom to the collecting pontoon on the sea surface. Accordingly, sea water may be taken in from a sea bottom side in the area provided with the foreign-object inflow prevention device while the foreign objects are collected by the collecting pontoon.

Furthermore, as the horizontal net is clogged up and the amount of water intake from the area provided with the horizontal net is decreased, the flow speed is increased, and accordingly, the amount of water intake in the foreign-object inflow prevention device is increased.

As a result, even when the horizontal net is clogged up by the foreign objects, a stable amount of water intake to a plant is ensured.

Similarly, when the horizontal net is clogged up, jellyfish are guided toward the foreign-object inflow prevention device, and therefore, the collection rate of jellyfish according to the foreign-object inflow prevention device is also improved.

Note that the horizontal net is preferably provided with buoyancy in order to prevent the horizontal net from sinking down by sinking force caused by fluid resistance that increases when the horizontal net is clogged up.

Figure 4:
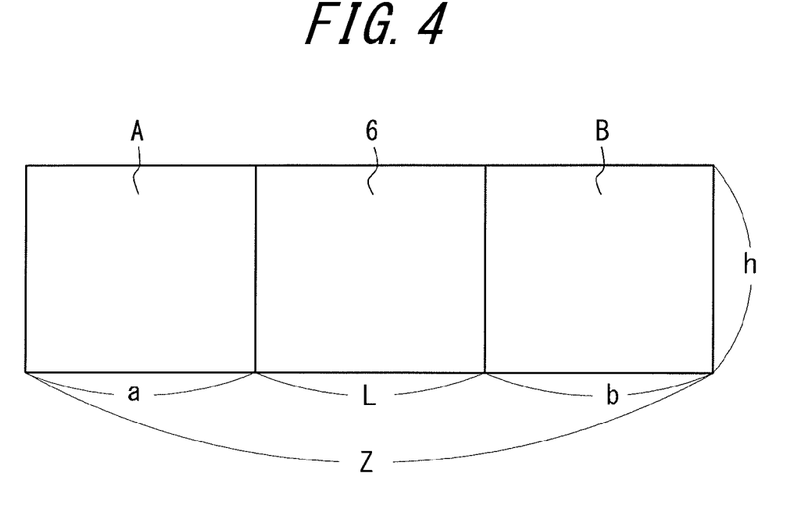
FIG. 4 is a view for illustrating a spread length of a horizontal net.

As illustrated in FIGS. 1 and 4, among an entire line S determined by extending a line along which the horizontal net is provided, portions of the horizontal net located on both outer sides thereof are defined as A and B, and lengths along the lines are defined as a (m) and b (m).

Under this circumstance, it is preferable to set the flow speed in the portions A and B (which correspond to an effective water-intake section) located on both the sides of the horizontal net to be 0.2 m/s or less. The reason is that, when the flow speed in the effective water-intake section is overly increased, it is difficult to prevent entrance of nekton other than jellyfish, such as fish, which may bring about harmful effects on fishing resources.

On the other hand, in order to reduce cost, it is better to set a larger spread length L, so that the number of foreign-object inflow prevention devices to be provided is reduced.

In view of the above, the following condition is preferably satisfied:

$$Q/\{(a+b)\times h\} \leq 0.2$$

where Q (m³/s) represents the amount of water intake in the effective water-intake section, and h (m) represents a height of the horizontal net.

That is to say, the following condition is preferably satisfied:

$$0 < L \leq Z - Q/(0.2 \times h)$$

where, as illustrated in FIG. 4, L (m) represents the spread length L of the horizontal net (that corresponds to the interval between adjacent foreign-object inflow prevention devices) in a direction along a water intake surface of the horizontal net, and Z (m) represents an entire length of an offshore line determined by extending the line along which the horizontal net is provided.

For example, in order to collect simply jellyfish, the length L is preferably set to be 40 m or less.

Note that the length L may be appropriately set by selecting the amount Q of water intake, the lengths a and b of the portions of the horizontal net located on both the outer sides thereof, and the height h of the horizontal net, as appropriate.

As illustrated in FIGS. 2 and 3, it is also preferable that an opening 13 is provided on the sea bottom side of the longitudinal net on at least one end side of the foreign-object offshore processing system.

The reason is that, even when a portion of the foreign-object inflow prevention device located on the sea bottom side is clogged up by the foreign objects or the like (e.g. when the amount of jellyfish which have flowed in is greater than a collection limit), the aforementioned flow of sea water allows continuation of water intake from an exterior of the foreign-object offshore processing system.

That is to say, the opening 13 may serve as a bypass that lets excessive jellyfish escape.

Furthermore, for the purpose of preventing a situation where the sea bottom side of the foreign-object inflow prevention device is clogged up by the foreign objects, a bubble tube 14 configured to discharge air bubbles is provided at a bottom portion of the bottom net 9 as illustrated in FIG. 2. In this case, when air is expelled from the bubble tube 14 so that air bubbles ascend to the sea surface, the foreign objects such as jellyfish may be ascended. By doing so, it may be further ensured that the foreign objects such as jellyfish are guided to the collecting pontoon 7 along the bottom net 9.

The jellyfish that have been collected by the jellyfish collecting pontoon 7 are sucked by a suction pipe 15 and then transferred alive to an offshore jellyfish storage tank 17 by a fish pump 16. The transferred jellyfish are stored in the storage tank 17 in sea water.

The storage tank 17 is typically provided in a position near the water intake in the pool P defined by the curtain wall where the flow of sea water is present.

The offshore jellyfish storage tank 17 is equipped with a water-quality monitoring sensor 17a configured to monitor a water quality within the tank. The water-quality monitoring sensor 17a constantly conducts monitoring so that the water quality within the tank satisfies a predetermined effluent standard.

The offshore jellyfish storage tank 17 is also equipped with an in-tank jellyfish-amount monitoring sensor 17b configured to monitor the amount of jellyfish stored within the tank. The in-tank jellyfish-amount monitoring sensor 17b conducts monitoring so that the amount of jellyfish stored within the tank does not exceed a processible amount.

When the collected jellyfish may not be transferred to the offshore jellyfish storage tank 17, the jellyfish are collected onshore by an onshore jellyfish collecting container 18.

With the above configuration, in the event of a plague of jellyfish where the amount of jellyfish which have flowed in is greater than the amount of jellyfish processible by the offshore jellyfish storage tank 17, the collected jellyfish may be collected by the onshore jellyfish collecting container 18 as a kind of emergency evacuation procedure and then processed by predetermined waste processing.

It is possible to switch between transferring the sucked jellyfish to the offshore storage tank 17 and transferring the sucked jellyfish to the onshore jellyfish collecting container 18, with use of a valve 19.

When the sucked jellyfish are fed to the offshore jellyfish storage tank, the jellyfish are drained by a draining separator 20, and when the sucked jellyfish are fed to the onshore jellyfish collecting container, the jellyfish are separated by a separator 21.

EXAMPLES

Figure 5:
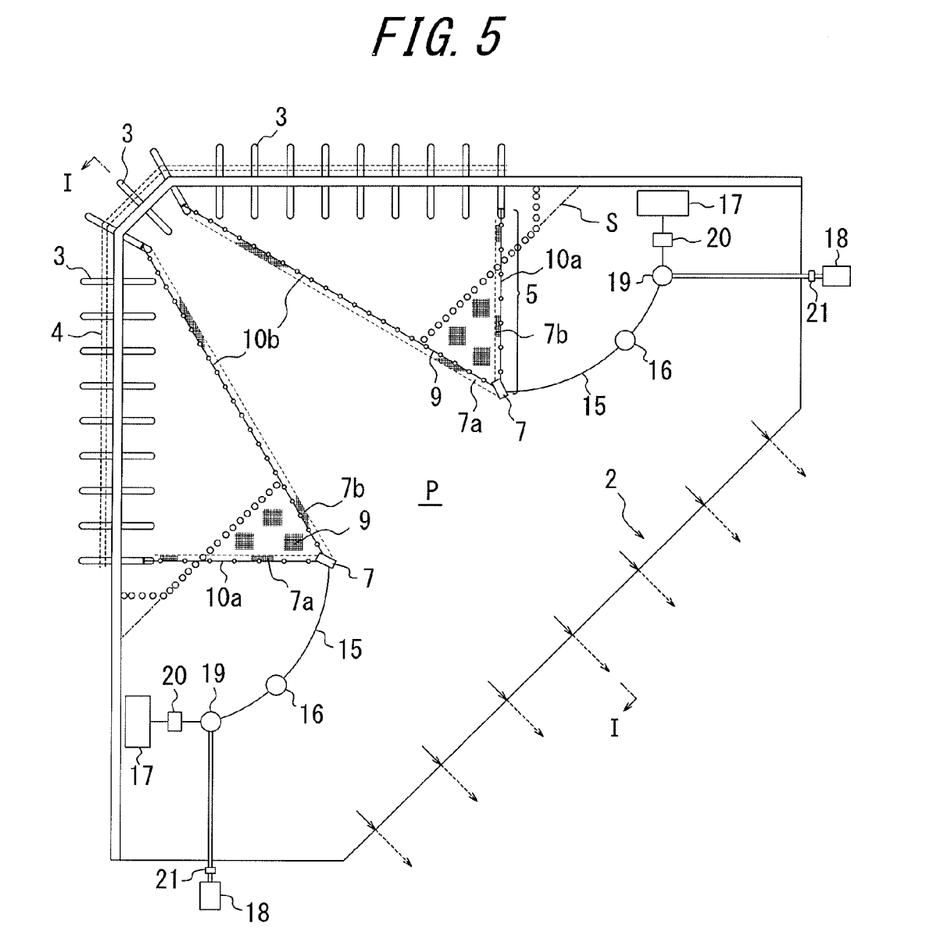
FIG. 5 illustrates a state where a foreign-object offshore processing system according to Comparative Example is provided at sea.

In order to demonstrate the advantageous effects of the present invention, an experiment was conducted to measure the collection rates of jellyfish with respect to the foreign-object offshore processing system as illustrated in FIG. 1, as Example of the present invention, and with respect to the foreign-object offshore processing system that did not include the horizontal net as illustrated in FIG. 5, as Comparative Example.

The experiment was conducted using a CFD (Computational Fluid Dynamics) analysis as follows.

That is to say, since swimming ability of jellyfish is approximately 3 cm/s, and the flow speed of the sea water in the pool defined by the curtain wall is approximately 5 cm/s, the flow of jellyfish may be analyzed as the flow sea water.

Pseudo-jellyfish (i.e. 100 W heat sources) were arranged at an equal interval on an upstream side from the sea surface to the sea bottom, and a rate of an amount of heat that passed through the foreign-object offshore processing system to an amount of heat that was provided on the upstream side was calculated as the collection rate of jellyfish.

Simulation was conducted based on assumption that solely dynamics of a water intake pump affected an analysis area.

In Example of the present invention, the horizontal net has the spread length L=40 m.

Example of the present invention was evaluated both before clogging of the horizontal net and during clogging of the horizontal net.

Table 1 shows results of the evaluation.

Note that in Table 1 two foreign-object inflow prevention devices are denoted as "First" and "Second."

TABLE 1

|  |  | Collection Rate by Foreign-Object Inflow Prevention Devices (%) | | Collection Rate by Horizontal Net (%) | Whole Collection Rate (%) |
|---|---|---|---|---|---|
|  |  | First | Second |  |  |
| Example | Before Clogging of Horizontal Net | 20.9 | 11.3 | 54.2 | 86.4 |
|  | During Clogging of Horizontal Net | 40.8 | 31.8 | 0 | 72.6 |
| Comparative Example |  | 20.7 | 11.2 | — | 31.9 |

As shown in Table 1, according to the offshore processing system of the present invention, the collection rate by the horizontal net before clogging of the horizontal net is significantly high. Thus, it is to be understood that the collection rate of jellyfish according to the offshore processing system of the present invention as a whole is considerably higher than a conventional offshore processing system.

Furthermore, during clogging of the horizontal net, although the horizontal net itself is not expected to help collect jellyfish, the horizontal net provides the foreign-object guiding effect as described above, and therefore the collection rate of jellyfish by the foreign-object inflow prevention devices is dramatically increased compared with Comparative Example. As a result, as is to be understood, the collection rate of the system as a whole is considerably higher than Comparative Example.

In addition, with respect to the offshore processing system according to Example of the present invention, an experiment was conducted on an actual system to evaluate an operating state of the plant, and it was found that the plant was not placed into a limited operation state due to a shortage in the amount of water intake.

REFERENCE SIGNS 1 foreign-object offshore processing system
2 water intake
3 steel pipe pile
4 curtain wall
5 foreign-object inflow prevention device
6 horizontal net
7 collecting pontoon
8a, 8b longitudinal net
9 bottom net
10a, 10b floating chain
11a, 11b lateral net
12 foreign object (jellyfish)

13 opening
14 bubble tube
15 suction pipe
16 fish pump
17 storage tank
17a sensor
18 collecting container
19 valve
20 draining separator
21 separator
P pool defined by curtain wall

The invention claimed is:

1. A foreign-object offshore processing system, comprising:
 a plurality of foreign-object inflow prevention devices that are configured to prevent inflow of a foreign object into a water intake and that are provided at an interval, wherein the water intake is downstream of the foreign-object processing system, each of the plurality of foreign-object inflow prevention devices including:
  a collecting pontoon that is configured to serve as an inlet of the foreign object and that is provided to float on a sea surface of a pool defined by a curtain wall, the pool being for drawing cooling sea water from sea toward the water intake;
  a bottom net provided to spread out toward a sea bottom on an upstream side in a triangular shape with the collecting pontoon as a vertex;
  a longitudinal net fixed to each of two floating chains in a suspended manner so as to be spread out in a surface area of sea, the two floating chains being provided to extend on the sea surface from the collecting pontoon in correspondence with two sides extending from the vertex of the triangular shape forming the bottom net; and
  a net provided to spread out between the bottom net and at least a portion of the longitudinal net; and
 a substantially horizontal net is provided so as to cover an interval between adjacent ones of the plurality of foreign-object inflow prevention devices.

2. The foreign-object offshore processing system of claim 1, which satisfies the following condition:

$$0<L<Z-Q/(0.2\times h)$$

where L (m) represents a spread length of the substantially horizontal net, Z (m) represents an entire length of an offshore line determined by extending a line along which the substantially horizontal net is provided, Q(m$^3$/s) represents an amount of water intake in an effective water-intake section, and h (m) represents a height of the substantially horizontal net.

3. The foreign-object offshore processing system of claim 2, wherein an opening is provided on a sea bottom side of the longitudinal net on at least one end side of the foreign-object offshore processing system.

4. The foreign-object offshore processing system of claim 2, wherein a bubble tube configured to discharge air bubbles is provided in a lower portion of the bottom net.

5. The foreign-object offshore processing system of claim 1, wherein an opening is provided on a sea bottom side of the longitudinal net on at least one end side of the foreign-object offshore processing system.

6. The foreign-object offshore processing system of claim 5, wherein a bubble tube configured to discharge air bubbles is provided in a lower portion of the bottom net.

7. The foreign-object offshore processing system of claim 1, wherein a bubble tube configured to discharge air bubbles is provided in a lower portion of the bottom net.

* * * * *